(12) United States Patent
Blot et al.

(10) Patent No.: US 9,272,470 B2
(45) Date of Patent: Mar. 1, 2016

(54) METHOD OF FABRICATING AN AIRCRAFT PART BY INFUSING RESIN

(75) Inventors: Philippe Blot, Nantes (FR); Benoit Hochart, Nantes (FR); Stephane Bechtel, Vertou (FR)

(73) Assignee: Airbus Operations SAS (FR)

( * ) Notice: Subject to any disclaimer, the term of this patent is extended or adjusted under 35 U.S.C. 154(b) by 1004 days.

(21) Appl. No.: 13/386,576

(22) PCT Filed: Jul. 16, 2010

(86) PCT No.: PCT/FR2010/051498
§ 371 (c)(1),
(2), (4) Date: Jan. 23, 2012

(87) PCT Pub. No.: WO2011/015747
PCT Pub. Date: Feb. 10, 2011

(65) Prior Publication Data
US 2012/0126060 A1    May 24, 2012

(30) Foreign Application Priority Data
Jul. 28, 2009    (FR) ..................................... 09 55290

(51) Int. Cl.
*B29C 70/54*    (2006.01)
*B29C 70/44*    (2006.01)
*B29L 31/30*    (2006.01)

(52) U.S. Cl.
CPC ............. *B29C 70/443* (2013.01); *B29C 70/546* (2013.01); *B29L 2031/3076* (2013.01); *Y02T 50/433* (2013.01)

(58) Field of Classification Search
CPC ..................... Y02T 50/433; B29L 2031/3076; B29C 70/546; B29C 70/443
See application file for complete search history.

(56) References Cited

U.S. PATENT DOCUMENTS

| 5,770,155 | A | * | 6/1998 | Dunphy et al. ............ 422/82.05 |
| 6,048,488 | A | | 4/2000 | Fink et al. |
| 7,081,218 | B2 | * | 7/2006 | Sekido et al. ................ 264/40.1 |
| 8,192,662 | B2 | * | 6/2012 | Asahara et al. ............... 264/156 |
| 2004/0130072 | A1 | | 7/2004 | Sekido et al. |
| 2006/0130993 | A1 | | 6/2006 | Blanton et al. |
| 2008/0224360 | A1 | | 9/2008 | Ashton et al. |
| 2009/0142496 | A1 | | 6/2009 | Blanton et al. |

(Continued)

FOREIGN PATENT DOCUMENTS

| DE | 199 12 723 C1 | 11/2000 |
| DE | 10 2006 031 336 A1 | 1/2008 |
| EP | 1 555 104 A1 | 7/2005 |

(Continued)

OTHER PUBLICATIONS

International Search Report issued in International Patent No. PCT/FR2010/051498 dated Dec. 6, 2010 (with translation).

(Continued)

*Primary Examiner* — Richard Chang
(74) *Attorney, Agent, or Firm* — Lerner, David, Littenberg, Krumholz & Mentlik, LLP

(57) ABSTRACT

The method of fabricating an aircraft part comprises the steps of placing in a stack comprising a preform at least one layer of a material that presents permeability to a predetermined resin that is less than the permeability of a portion of the preform that is the closest to the layer; and placing a resin presence sensor on a side of the layer that is remote from the preform.

11 Claims, 2 Drawing Sheets

(56) References Cited

U.S. PATENT DOCUMENTS

2010/0044912 A1    2/2010   Zahlen et al.
2010/0260884 A1   10/2010   Boyeldieu et al.

FOREIGN PATENT DOCUMENTS

| EP | 1 674 245 A1 | 6/2006 |
| FR | 2 921 295 A1 | 3/2009 |
| JP | A-2004-309332 | 11/2004 |

OTHER PUBLICATIONS

International Preliminary Report on Patentability issued in International Application No. PCT/FR2010/051498 dated Dec. 6, 2010.

Office Action issued in Japanese Patent Application No. 2012-522210 mailed Jul. 15, 2014 (with partial translation).

* cited by examiner

METHOD OF FABRICATING AN AIRCRAFT PART BY INFUSING RESIN

FIELD OF THE INVENTION

The invention relates to fabricating aircraft parts out of composite material, and in particular to methods implementing resin infusion.

BACKGROUND OF THE INVENTION

A known method of fabricating aircraft parts out of composite material requires a step of using the effect of a vacuum to infuse a resin through a preform comprising fibers. More precisely, the resin is spread over a surface under the entire textile preform by using a medium that presents high permeability to the resin in comparison with the preform. Thereafter the resin is caused to infuse through the preform in a direction perpendicular to the plies, i.e. to the layers of reinforcement making up the preform. Infusion is stopped either when resin stops flowing through the inlet to the mold, or else when the quantity of resin that has been injected is the amount that is needed theoretically, which quantity is measured in terms of its weight. That relates to a method that makes use of a semi-permeable membrane. With such a membrane, the resin remains confined within the mold under the membrane. In the absence of such a membrane, the end of the injection operation is detected by resin exiting through the vents that were used to generate the vacuum in the mold.

The quantity of resin injected while implementing the method influences the soundness of the part. If the quantity that is injected is not sufficient, the part runs the risk of presenting one or more dry zones. The quantity also has an influence on the thickness of the part if the infusion is performed under a vacuum bag: it is then the volume fraction of fibers in the part that suffers and consequently the mechanical properties of the part.

Unfortunately, while making a part out of composite material by infusing resin into a textile preform placed under a semi-permeable membrane, it is difficult for various reasons to detect when the preform has finished being filled with the resin.

Firstly, it is difficult to detect when the flow of resin has stopped since measurement by weighing the injection vessel is not sufficiently accurate. The presence of pipework between the vessel and the mold disturbs the measurement. Furthermore, it is difficult to measure large volumes of resin accurately. Finally, leaks may occur in the resin circuit, in the mold, or in materials situated in its environment.

Furthermore, it is difficult to calculate the quantity of resin that needs to be injected into the preform, since it is difficult to determine the volume of the preform. Likewise, there is no control over the inside volume of the resin feed pipes, since their length is determined by the operator as a function of the setup and as a function of the size of the heater means used for polymerizing the resin after infusion. Finally, there remain uncertainties concerning the physical characteristics of the resin (coefficient of expansion, density, compressibility).

Furthermore, when infusing under a vacuum bag, i.e. not in a closed mold, it is found that the flow rate of the resin stops initially in temporary manner. When the theoretical quantity of resin has been injected, the flow rate tends towards zero, thereby reducing head losses between the injection pot and the top of the preform. The head loss is proportional to the square of the flow rate. A consequence of reducing head loss is to reduce the pressure difference between the injection pot and the top zone of the preform. If the pressure in the injection pot is equal to atmospheric pressure (as is generally true when injecting under a vacuum bag), the pressure in the preform, and thus under the vacuum bag, becomes close to atmospheric pressure. This leads to a reduction in the compacting pressure (which pressure is equal to the difference between the pressure under the vacuum bag and the pressure acting thereon and equal to atmospheric pressure). This results in an increase in the thickness of the textile preform and thus to additional resin being drawn in, thereby giving rise to a temporary increase in the flow rate before it drops once more down to zero.

OBJECT AND SUMMARY OF THE INVENTION

An object of the invention is to obtain better control over the quantity of resin for injection in the various types of method that implement resin infusion.

To this end, the invention provides a method of fabricating an aircraft part, which method comprises the following steps:
placing in a stack comprising a preform at least one layer of a material that presents permeability to a predetermined resin that is less than the permeability of a portion of the preform that is the closest to the layer; and
placing a resin presence sensor on a side of the layer that is remote from the preform.

Thus, by injecting the resin into the preform from its end remote from the relatively impermeable layer(s), resin impregnation takes place in said layer(s) only after the preform has been filled. Given their position on the other side of the preform and given their permeability, each additional layer of material fills with resin only after the resin has infused through the entire preform. The resin thus tends to finish off impregnating the last layers of the preform before impregnating the additional layers. When information is received from the sensor indicating that resin is present, injection is stopped. At this stage, the resin has already filled the preform.

Advantageously, the sensor is placed under a semi-permeable membrane of the installation.

The invention also provides an aircraft part that has been fabricated using a method of the invention and that belongs to one or more of the following types of part: a part for a fuselage; a part for a wing; a part for a stabilizer; and a structural part, a strut part, and/or a nacelle part.

The invention also provides an aircraft including at least one part fabricated by means of a method of the invention.

The invention also provides an installation for fabricating an aircraft part, the installation comprising in a stack:
a preform;
at least one layer of a material presenting permeability to a predetermined resin that is less than the permeability of a portion of the preform that is closest to the layer; and
a sensor for sensing the presence of the resin and arranged on a side of the layer that is remote from the preform.

Advantageously, the installation includes a plurality of layers of the material, the sensor being preferably arranged between the two layers or between two of the layers.

This further improves the reliability of the method for ensuring that the preform is appropriately impregnated before the resin reaches the additional layers.

In an embodiment, the layer of material extends between a semi-permeable membrane and a caul plate of the installation.

Advantageously, the layer of material presents a fiber volume fraction greater than the fiber volume fraction of the preform portion closest to the layer, and/or weaving that is tighter than weaving of the portion of the preform that is closest to the layer.

These last two circumstances constitute embodiments that enable the layers of material to be given the above-mentioned permeability characteristic.

Advantageously, the permeability is that of the material in a direction perpendicular to a plane tangential to the layer, the material of the layer preferably also presenting permeability to the resin that is less than that of the portion of the preform in a direction parallel to said plane.

Thus, it is ensured that the resin tends to finish off impregnating the last layers of the preform before propagating along the perpendicular direction into the additional layer(s). When the permeability of the material is also less than that of the preform in a direction parallel to the general plane of the layer, then the resin is prevented from propagating prematurely into the additional layers and thus impregnating other zones of the preform, which could lead to dry zones being left in the part. This option is advantageous in particular when the head loss in the preform in a direction parallel to the plane is not constant, in particular when the thickness of the preform and the thickness of the part that is to be made vary in said direction.

Preferably, the sensor includes a material presenting capacitance when it is in contact with the resin that is different from its capacitance when it is not in contact with the resin.

This is an embodiment of the sensor that is particularly simple to implement.

Advantageously, the sensor is suitable for transmitting information about a degree of curing of the resin.

It is thus possible to determine the instant that corresponds to the end of polymerization and thus for example to minimize the length of time the part is present in heater means such as stoves and autoclaves.

Advantageously, the sensor is suitable for delivering information relating to a viscosity of the resin.

Provision may be made for the installation to have a plurality of sensors.

Thus, it is possible to detect non-uniformity of filling, if any, e.g. close to the surface of the part.

BRIEF DESCRIPTION OF THE DRAWINGS

Other characteristics and advantages of the invention appear further from the following description of an embodiment given by way of non-limiting example and with reference to the accompanying drawings, in which.

MORE DETAILED DESCRIPTION

Figure 1:
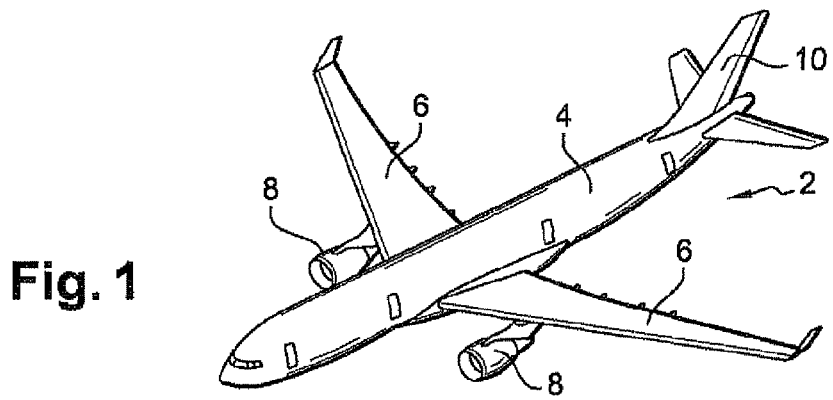
FIG. 1 is a perspective view of an aircraft of the invention.

FIG. 1 shows an aircraft 2 of the invention, here an aerodyne, and in the present example an airplane. The airplane has a fuselage 4 and two wings 6 carrying respective engines 8. The airplane also has a tail 10.

With reference to FIGS. 2 to 5, there follows a description of the general principles of an implementation of the method of the invention. The idea is to fabricate one or more parts of the airplane 2 that are made out of composite material, specifically here out of a plastics material reinforced by glass fibers.

Figure 2:
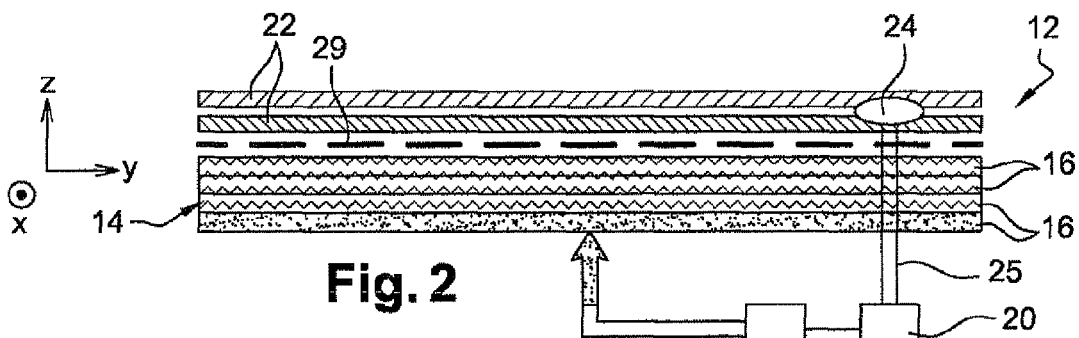
FIGS. 2 to 5 are section views through an installation of the invention showing the general principle of an implementation of the method during four successive steps.

In order to implement the method, the installation 12 comprises a preform 14 comprising a plurality of superposed layers or plies 16, specifically of plane or generally plane shape. Each of these layers comprises fibers. There they are carbon fibers, but they could equally be fibers of some other type, e.g. glass fibers. The preform is made up of a plurality of layers of a fiber fabric that are stacked on one another. However more generally, the fibers may be long or short fibers making up a fabric or stitched sheets or indeed stacked sheets. They could also be mats of fibers or of cut fibers. In FIG. 2, there are four layers 16 that are stacked to form the textile preform 14.

The installation 12 includes injector means 18 for injecting a resin that is to infuse through the stack. These means comprise in particular a resin tank and control means 20 for controlling the injector means.

The method may be implemented using any type of epoxy resin. Specifically, use may be made of the resin having the reference RTM6 from the supplier Hexcel. It is also possible to use other types of injectable resin, such as polyester, phenolic, or bismaleimide resins.

The installation also includes one or more additional layers 22, e.g. forming plies. Specifically, two layers 22 are provided. These layers are here arranged on top of the preform 14 and they are superposed on the layers 16 in the stack. Specifically, they are plies of glass fiber fabric. Nevertheless, they could equally well be made of some other type of fiber, e.g. carbon fibers.

An X, Y, Z, frame of reference is used herein, where the directions X and Y are mutually perpendicular and parallel and tangential to the planes of the layers 16 and 22, while the direction Z is perpendicular thereto.

The additional layers 22 have permeability to the resin that is used in the method that is less than the permeability of the layers in the preform 14. Specifically, this property applies equally well when the permeabilities are measured in any direction in the XY plane forming each of the layers 22 and when they are measured in the direction Z. Furthermore, although it is possible to make provision for this permeability to be less only than the permeability of the upper layers of the preform 14 or of the topmost layer thereof, in the present example this permeability is less than the permeability of each of the layers of the preform.

In order to obtain this permeability property, provision is made specifically for each layer 22 to be woven more tightly than any of the layers 14, i.e. to present a quantity of fibers per unit area that is greater than in each of the layers 14. Alternatively, or additionally, provision may also be made for the volume fraction of fibers to be greater in the layers 22 than in the layers 14.

Specifically, the installation 12 is arranged so that resin is injected into the bottom of the stack as constituted in this way, i.e. into the bottom layer of the preform.

The installation 12 also includes a sensor 24 for detecting the presence of resin and an associated acquisition and measurement system. For example, this may be a dielectric sensor. The sensor presents capacitance that varies depending on whether or not it is in contact with the resin.

In this example, the sensor 24 comprises a system of interdigitated electrodes (it comprises interlaced grids) suitable for carrying an electric current that generates an electric field at the surface of the sensor, with the electrical characteristics of the field varying as a function of the material that it is touching. Thus, when not in contact with resin, the sensor measures the permeability of empty space, which is very different from that of a semiconductor material or an insulating material such as the resin. Among other things, the sensor makes it possible to measure the dielectric characteristics of the resin-forming material and thus to track how it varies during the time of implementation and in particular during the time the part is polymerizing. It thus enables the method to be tracked. Thus, the presence of the resin, and then its degree of its curing modify the impedance of the dielectric sensor. By comparing the signals (phase shifts) provided by the sensor, it is consequently possible to detect firstly the presence of the resin, and subsequently its degree of curing (or its degree of polymerization). Given that the sensor carries a current and is interdigitated, it is electrically insulated locally, but it must be capable of coming into contact with the resin. That is why it is possible, as in this example, to use an electrically non-conductive material for the additional layers 22, such as glass fibers, thereby making it possible to avoid short-circuiting between the electrodes. The sensor 24 is placed between the two additional layers 22. The sensor is electrically connected in appropriate manner, e.g. to the means 20, via a circuit 25.

In the stack, a layer 29 of delaminating fabric is interposed between the preform 14 and the layers 22 in order to make it easier to separate the part from the layers 22 at the end of the method.

The method of the invention is implemented as follows in the present example.

The liquid resin is injected into the stack via its bottom layer. FIG. 2 shows the layer 16 impregnated with resin that is beginning to infuse into the stack in the plane of the layer and in the direction Z.

Figure 3:
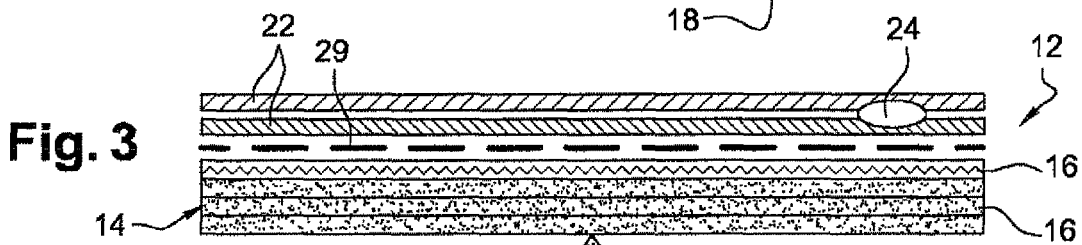

Thereafter, the resin infuses into the following layer 16, and then the next following layer, diffusing in particular along the direction Z. In FIG. 3, it can be seen that the three bottom layers 16 are impregnated with the resin, while the last or top layer 16 and the two additional layers 22 have still not received any resin.

Figure 4:
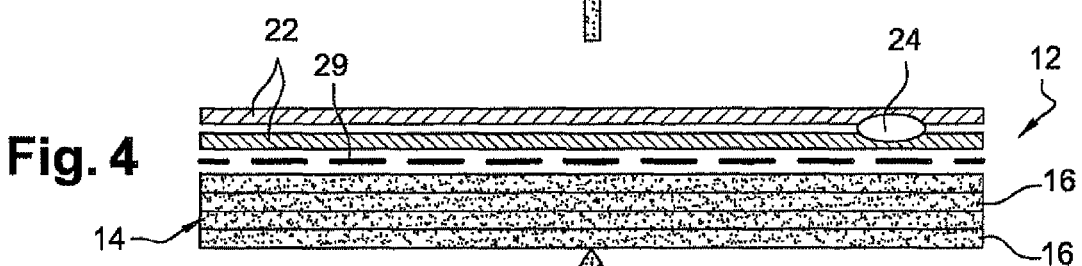

Infusion then takes place in the fourth layer 16 such that in FIG. 4 the entire preform 14 is impregnated with resin. Given the difference of permeability between the layers 16 and 22, before it begins to infuse in the first additional ply 22, the resin finishes off completely impregnating the top ply 16 of the preform.

Figure 5:
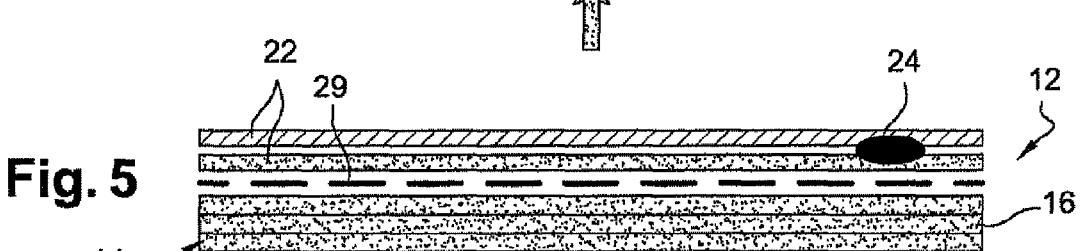

Finally, as shown in FIG. 5, once the preform has been impregnated completely, the resin infuses into the layer of delaminating fabric 29 and then into the lower additional layer 22, thereby putting the sensor 24 into contact with the resin. The sensor thus transmits information to the means 20 or to the operator indicating that the resin has infused through one of the layers 22. These means then interrupt the injection of resin into the stack.

As the method continues, the resin cures and its degree of curing is tracked directly by means of the information delivered by the sensor. When this information indicates that the polymerization of the resin is complete, the part is extracted from the stack.

Figure 6:
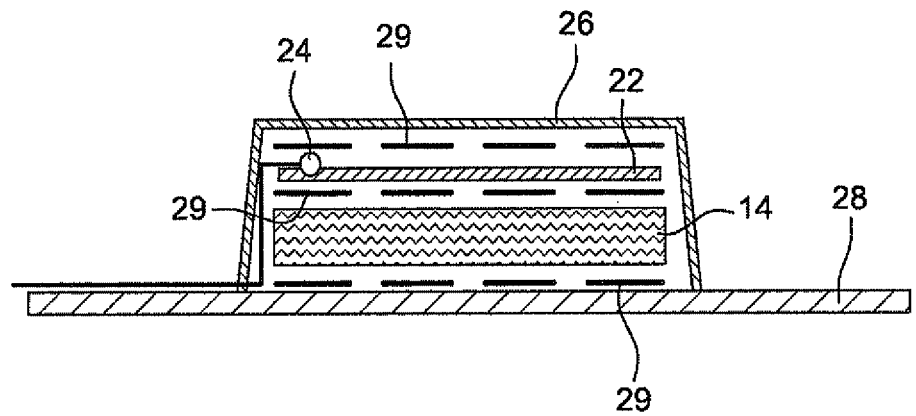
FIGS. 6 to 8 are analogous views showing three examples of installations of the invention.

A first detailed embodiment of the installation 12 is shown in FIG. 6. This is an installation for injection into a closed mold. The installation presents a top mold 26 and a bottom mold 28, both of which are internally covered in an unmolding agent. Here the bottom mold is plane, while the top mold forms a cavity enclosing the stack. Inside the mold 26 there can be seen the preform 14 carrying the additional layers 22, which are not distinguished from one another in this drawing. The installation also includes three layers 29 of delaminating fabric. The bottom layer is interposed between the preform 14 and the bottom mold 28. The top layer is interposed between the additional layers 22 and the top mold 26. The third layer is interposed between the preform 14 and the additional layers 22. The three layers of delaminating fabric 29 make it easy at the end of the method to separate the fabricated part, the molds, and the layers 22. The sensor 24 is once more inserted between the layers 22. It should be observed here that the delaminating fabric is not needed between the bottom mold 28 and the preform 14 if an unmolding agent has been deposited beforehand.

Figure 7:
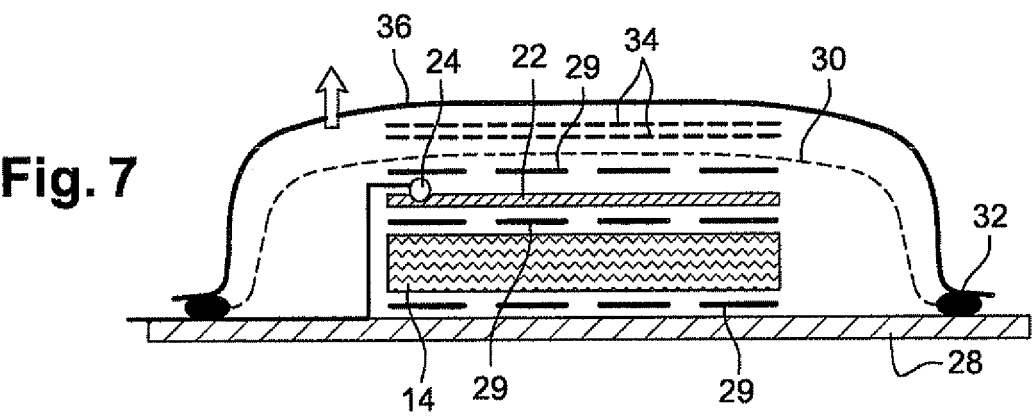

A second embodiment of the installation is shown in FIG. 7, which installation is provided with a semi-permeable membrane 36. There can be seen the entire stack as shown in FIG. 6, which was interposed between the mold 26 and 28. Only the bottom mold 28 is present in this example. Above the topmost layer 29 of the delaminating fabric, there is arranged a semi-permeable membrane 30 that comes down over the sides of the stack to be connected to the mold 28 by means of a sealing gasket 32. Layers 34 of a draining fabric are placed in the stack above the membrane, there being two of them in the example shown. Finally, the assembly is surmounted by a vacuum bag 36 that also comes down to the sealing gasket 32 and that is fastened thereto.

The invention presents a major advantage when the mold includes a semi-permeable membrane. It enables information about the end of injection to be made available while minimizing any risk of dry zones remaining in the part. The additional plies 22 improve drainage of the vacuum pressure within the preform at the end of injection, which can only improve the quality with which the fabricated part is impregnated.

Figure 8:
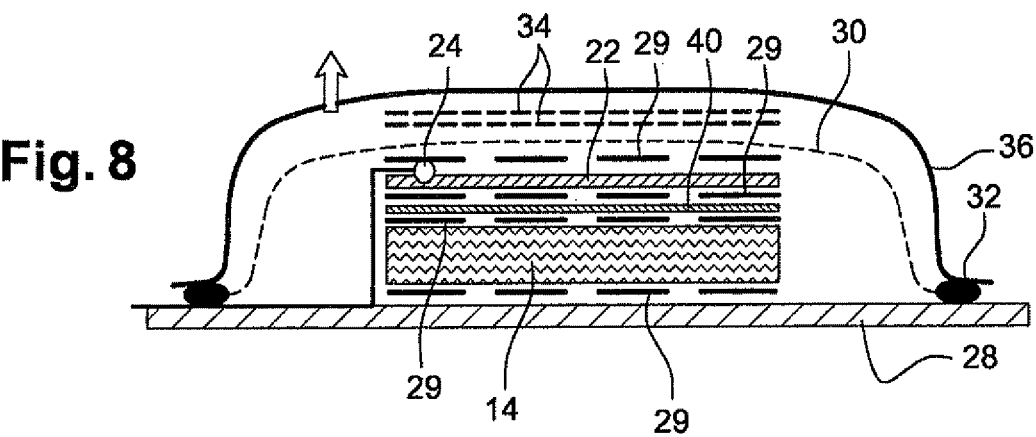

Unlike the above embodiment, the embodiment of FIG. 8, still provided with a vacuum bag, is now provided with a caul plate 40. This embodiment of the installation differs from the above embodiment solely by the plate 40 being inserted under the intermediate layer 29 of delaminating fabric, and by the presence of an additional layer 29 of delaminating fabric under the plate 40 and above the preform. The additional layers 22 are thus now situated between the caul plate 40 and the semi-permeable membrane 30 insofar as the caul plate is itself situated between the textile preform 14 and the semi-permeable membrane.

The method of the invention is implemented as shown in FIG. 2 to 5 using one or another of these installations. In particular, the resin is injected on each occasion into the bottom zone of the stack so that the resin initially impregnates the textile preform and only subsequently starts impregnating the additional plies 22. Once the sensor has come into contact with the resin, it sends a signal indicating that the preform has thus been suitably impregnated.

The method and the installation of the invention may be used to make parts for the airplane of FIG. 2. They may be covering panels, longerons, spars, or fuselage panels 4. They may be parts occupying an area or stabilizer parts such as flaps or ailerons. They may be structural parts such as longerons, spars, mats, or engine nacelles. The part may be a wing part.

Naturally, numerous modifications may be applied to the invention without going beyond the ambit thereof.

The preform and the resulting part need not be plane in shape.

The invention is not limited to fabricating aircraft parts. It is applicable to any part (e.g. a panel, a cover, a hull, . . . ) that is made of composite material, in particular for boats (hull and deck), rail cars (hatch, partition, body), and motor cars (hood, . . . ) made by infusing resin.

Provision may be made for the injection to take place not in an upward direction as described with reference to the figures, but in a downward direction, starting from the top of the stack. Under such circumstances, the additional layers 22 are located under the preform.

Given that the delaminating fabric generally presents permeability that is less than that of the layers 16 of the preform, it is possible to use the layer of delaminating fabric as an additional layer separating the sensor from the preform. For example, in the stack of FIG. 2, it is possible to omit the additional layers 22.

Provision may be made for the additional layer(s) 22 or indeed for one of them to occupy an extent smaller than the extents of the other layers in the stack, and in particular an extent less than that of the preform. The layer 22 may also be a local layer that does not extend from one edge to the other of the stack. It is thus possible to envisage there being only one layer 22 that is formed merely by a glass fiber mat on which the sensor 24 is placed in order to be separated from the preform.

What is claimed is:

1. A method of fabricating an aircraft part, the method comprising:
    placing in a stack comprising a preform at least one layer of a material, wherein the preform includes a plurality of layers including at least a first layer and a last layer, the last layer having a first permeability to a predetermined resin, the material having a second permeability to the predetermined resin less than the first permeability of the last layer, the at least one layer having a first side and a second side opposite the first side, the first side of at least one layer being superposed on the last layer of the preform; and
    placing a resin presence sensor on the second side of the at least one layer; and
    injecting the predetermined resin into the preform from the first layer of the preform.

2. The method of claim 1, further comprising interposing a layer of delaminating fabric between the last layer of the preform and the at least one layer.

3. An aircraft part, fabricated by a method and belonging to a portion of at least one of the following types of part: a part for a fuselage; a part for a wing; a part for a stabilizer; and a structural part, a strut part, and/or a nacelle part, the method comprising:
    placing in a stack comprising a preform at least one layer of a material, wherein the preform includes a plurality of layers including at least a first layer and a last layer, the last layer having a first permeability to a predetermined resin, the material having a second permeability to the predetermined resin that is less than the first permeability of the last layer, the at least one layer having a first side and a second side opposite the first side, the first side of at least one layer being superposed on the last layer; and
    placing a resin presence sensor on the second side of the at least one layer; and
    injecting the predetermined resin into the preform from the first layer of the preform.

4. An installation for fabricating an aircraft part, the installation comprising, in a stack,:
    a preform including a plurality of preform layers including at least a first layer and a last layer, the last layer having a first permeability to a predetermined resin;
    at least one layer of a material and having a first side and a second opposite the first side and having a second permeability to the predetermined resin that is less than the first permeability of the last layer, the first side of the at least one layer being superposed on the last layer of the preform; and
    a sensor for sensing the presence of the resin and arranged on the second side of the at least one layer,
    wherein the stack is configured to receive the predetermined resin injected at the first layer of the preform.

5. The installation according to claim 4, having at least a second layer of the material superposed on the at least one layer, the sensor being placed between the at least one layer and the second layer.

6. The installation according to claim 4, wherein the at least one layer has a first fiber volume fraction that is greater than a second fiber volume fraction of the last layer of the preform.

7. The installation according to claim 4, wherein the at least one layer has a weaving tighter than a weaving of the last layer of the preform.

8. The installation according to claim 4, wherein the second permeability of the material is a permeability in a direction perpendicular to a plane tangential to the at least one layer, the material of the at least one layer also having the second permeability to the predetermined resin less than that of the last layer of the preform in a direction parallel to said plane.

9. The installation according to claim 4, wherein the sensor includes a material having a first capacitance, when the sensor is in contact with the predetermined resin, different from a second capacitance of the sensor, when the sensor is not in contact with the predetermined resin.

10. The installation according to claim 4, wherein the sensor is configured for transmitting information about a degree of curing of the predetermined resin.

11. The installation of claim 4, further comprising a layer of delaminating fabric interposed between the last layer of the preform and the at least one layer.

* * * * *